(12) United States Patent
Gladnick

(10) Patent No.: US 6,441,367 B1
(45) Date of Patent: Aug. 27, 2002

(54) CONTROL SYSTEMS AND METHODS FOR DIFFUSE ILLUMINATION

(75) Inventor: Paul G. Gladnick, Seattle, WA (US)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/323,916

(22) Filed: Jun. 2, 1999

(51) Int. Cl.⁷ .............................. H01J 5/16; G01B 11/14
(52) U.S. Cl. .................. 250/237 G; 356/616; 356/618; 356/625
(58) Field of Search ................................ 356/616, 618, 356/614, 625; 250/237 G; 359/599

(56) References Cited

U.S. PATENT DOCUMENTS

| | | | |
|---|---|---|---|
| 4,567,551 A | | 1/1986 | Choate |
| 4,687,326 A | * | 8/1987 | Corby, Jr. ...................... 356/5 |
| 4,706,168 A | | 11/1987 | Weisner |
| 4,729,070 A | | 3/1988 | Chiu |
| 4,747,684 A | * | 5/1988 | Weiser ....................... 356/446 |
| 4,893,223 A | | 1/1990 | Arnold |
| 5,038,258 A | | 8/1991 | Koch et al. |
| 5,155,775 A | * | 10/1992 | Brown .......................... 382/1 |
| 5,175,601 A | * | 12/1992 | Fitts ............................ 356/601 |
| 5,307,207 A | | 4/1994 | Ichihara |
| 5,592,246 A | * | 1/1997 | Kuhn et al. .................. 351/212 |
| 5,621,529 A | * | 4/1997 | Gordon et al. .............. 356/601 |
| 5,690,417 A | | 11/1997 | Polidor et al. |
| 5,753,903 A | | 5/1998 | Mahaney |

* cited by examiner

Primary Examiner—F. L. Evans
Assistant Examiner—Zandra Smith
(74) Attorney, Agent, or Firm—Oliff & Berridge, PLC

(57) ABSTRACT

A light pattern generator generates a pattern of continuous wave, modulated and/or pulsed light onto a face of a collimator. The light pattern is collimated by an optical element and directed to a focusing element which focuses the collimated light pattern onto a sample. A controller controls the pattern generator and the light source to determine a shape of the illuminated pattern on the face of the collimator. The controller also controls the frequency, positional phase angle and pulse width of the light source. Additionally, the controller may control the color of the light so that the color varies over time.

43 Claims, 10 Drawing Sheets

CONTROL SYSTEMS AND METHODS FOR DIFFUSE ILLUMINATION

BACKGROUND OF THE INVENTION

1. Field of Invention

This invention relates to systems and methods to generate diffuse illumination. In particular, this invention is directed to controlling a diffuse light source for a machine vision system.

2. Description of Related Art

Uniform, diffuse illumination of a sample part is often necessary in commercial vision systems to accentuate an edge of the sample part within a designated field of view. Since most sample parts are not transparent, diffuse illumination of the sample part is also necessary so that light which is reflected from the sample part can be collected by an imaging system. Furthermore, an adjustable diffuse illumination source accommodates sample parts having a wide variety of shapes.

Typically, the intensity of light emitted by a light source is adjustable when the magnification of the imaging system is also adjustable. The adjustable illumination provides the ability to illuminate sample parts having different characteristics, such as, for example, shape, composition, and surface finish.

Also, conventional light sources project light onto the sample part at an angle from a plane which is normal to the imaging plane. This angle is referred to as the angle of incidence. Light projected at an angle of incidence which is between 0 and 90 degrees may improve the surface contrast of the image and also more clearly illuminate textured surfaces. Typically, such light sources have a prescribed range for the angle of incidence. Conventionally, the angle of incidence varies between 10° and 70° relative to the plane that is normal to the optical axis of the imaging system. Such a range is relatively broad and, therefore, provides adequate contrast in an image of a sample part.

Furthermore, conventional vision systems can also adjust the circumferential position of the source of diffuse lighting about an optical axis. Typically, the position of the diffuse lighting source is adjustable in, for example, addressable sectors or quadrants. As such, any combination of sectors and quadrants of such a circular light pattern can be illuminated. Additionally, the intensity level of the light source can be coordinated with the circumferential position of the light source to optimize the illumination of a sample part edge.

For example, some conventional vision systems include an annular light source that emits rectangular or toroidal patterns. The light source is an annulus which is divided into four quadrants. Also, other conventional vision systems include a ring light having an annulus that is subdivided into eight sectors. Additionally, some conventional vision systems have hemispherically-shaped light sources to direct light from a multitude of positions relative to an optical axis. The center of the hemisphere serves as a focal point for the light sources. Furthermore, any combination of sectors and quadrants can simultaneously be illuminated with varying illumination levels.

SUMMARY OF THE INVENTION

Recently, manufacturers of conventional vision systems have started offering a solid-state replacement for the traditional tungsten filament lamp, e.g., a halogen lamp, that has been used in conventional diffuse light sources. These manufacturers now offer light emitting diodes (LEDs) that offer higher reliability, a longer service life, greater brightness, lower cost, good modulation capabilities and a wide variety of frequency ranges.

Some manufacturers of such conventional vision systems provide opto-electro-mechanical designs that partially achieve the characteristics of the conventional diffuse light sources discussed above. However, these opto-electro-mechanical devices are complicated, costly, lack versatility, and do not enhance a video inspection process. For example, these light sources require-overly intricate mechanical motion that results in a lower vision system throughput and an increase in cost. Other conventional solid-state light sources require a large number of discrete light sources in a two-dimensional array and an elaborate electronic cross-bar to energize them. Furthermore, other conventional solid-state light sources must accommodate at least fifty discrete light sources in a three-dimensional array housed in a large carriage.

Accordingly, conventional diffuse light sources are incapable of providing a full-featured, reliable, inexpensive system and method to diffusely illuminate a sample part. Moreover, conventional diffuse light sources only marginally provide the capability to control the intensity, angle of incidence and circumferential position. Such conventional diffuse light sources do not optimally illuminate sample parts for dimensional measurements when varying construction (e.g., shape), material (e.g., absorptivity, scattering, etc.), and surface properties (e.g., color or texture) are involved.

This invention provides control systems and methods that achieve the diffuse lighting effects that are currently offered on the market.

This invention separately provides control systems and methods that achieve all these features using a single solid-state source or small number of solid-state sources, such as LEDs or laser diodes.

This invention separately provides control systems and methods that provide color images by assembling RGB images from a monochrome camera.

This invention separately provides control systems and methods that create conventional as well as more versatile diffuse illumination using a simpler, more robust device.

This invention separately provides control systems and methods that allow the selection of illumination color.

This invention separately provides control systems and methods that preserve the high resolution necessary for dimensional metrology measurements without the unnecessary expense of multiple CCD color camera technology.

Using the control systems and methods of this invention, the illumination color may be controlled based on the sample part properties (e.g., pigmentation) in order to improve image contrast. Also, illumination color selection is used to produce a high resolution color image using a monochrome CCD detector.

Exemplary embodiments of the control systems and methods of this invention include a light pattern controller that includes a beam deflector that is mounted on a motor shaft. The beam deflector has a mirror. The beam deflector tilts in proportion to the centrifugal force exerted on the beam deflector when the motor shaft rotates. A light beam incident on the mirror is deflected by an angle that is defined by the tilt of the beam deflector.

Because the beam deflector is rotating, the deflected light beam sweeps out a cone. The deflected light beam cone is incident on a focusing element and sweeps out a circular pattern on the surface of the focusing element. The radius of the circular pattern is dependent on both the distance of the focusing element from the beam deflector and the angle at which the light beam is deflected. The greater the angle of deflection and the farther the focusing element is from the beam deflector, the larger the circular pattern becomes. Therefore, since the rotational speed of the motor shaft is directly proportional to the deflection angle and since the size of the circular pattern is directly proportional to the deflection angle, the size of the circular pattern is directly proportional to the rotational speed of the motor shaft.

The speed at which the light beam traverses the circular pattern is also directly proportional to the rotational speed of the motor shaft. Therefore, the rotational speed of the motor shaft controls both the size of the circular pattern and the speed with which the light beam traverses the light pattern. Thus, the motor and beam deflector control the light pattern.

The light beam is collimated by the focusing element to sweep out a column. This column of light is reflected by a mirror to be substantially parallel to and to surround an optical axis of an imaging device of a vision system. The imaging device, which may include a CCD, employs optical lenses to produce an image of a sample part positioned in a field of view and located at an object plane. The collimated pattern is focused onto the same field of view using another focusing element. Reflected and scattered light from the field of view is imaged onto the CCD using optical lenses.

In other exemplary embodiments of the systems and methods of this invention, the light pattern controller includes a two-dimensional scanning galvanometer. The galvanometer is driven to deflect the light beam to sweep out a cone.

In other exemplary embodiments of the systems and methods of this invention, the light pattern controller includes a liquid crystal device. The liquid crystal device includes an array of addressable sectors that controllably block portions of the light from the light source from impinging on the collimator, or controllably reflect portions of the light from the light source to impinge on the collimator. The liquid crystal device controls the pattern of light from the light source that impinges on the collimator.

The control systems and methods of this invention control the circumferential position, sectors and/or quadrants of the source of diffuse lighting about the optical axis by turning the light source on as the light beam passes a first desired position and by turning the light source off as the light beam passes a second desired position. The position of the effective illumination source is determined by the first and second positions. Moreover, multiple effective illumination sources can be created by turning on and off the light source multiple times for each revolution of the beam deflector. The circumferential length of the sector of illumination is determined based on the amount of time that elapses between the time at which the light source is turned on and the time at which the light source is turned off. This timing is determined either by measuring the rotary speed and position of the motor shaft on which the beam deflector is mounted or by the signals driving the galvanometer. In both cases, pre-registration of the light beam angular location about the imaging system optical axis is known.

Exemplary embodiments of the systems and methods of this invention incorporate the optical source monitoring as described in U.S. patent application Ser. No. 09/220,705, incorporated herein by reference in its entirety. The optical source monitoring of the incorporated 705 application measures the real-time optical power output from the solid-state devices. This is possible on continuous or pulse operated systems. The measurements are taken so that power output variations may be corrected. Power output variations are due primarily to aging, drive current fluctuations and temperature drifts. The intensity measurements permit a level of calibration and instrument standardization which can yield reproducible illumination among an instrument model line.

These and other objects of the invention will be described in or be apparent from the following description of various exemplary embodiments.

BRIEF DESCRIPTION OF THE DRAWINGS

Various exemplary embodiments of the invention will be described in conjunction with the following drawings in which like reference numerals designate like elements and wherein.

DETAILED DESCRIPTION OF EXEMPLARY EMBODIMENTS

Figure 1:
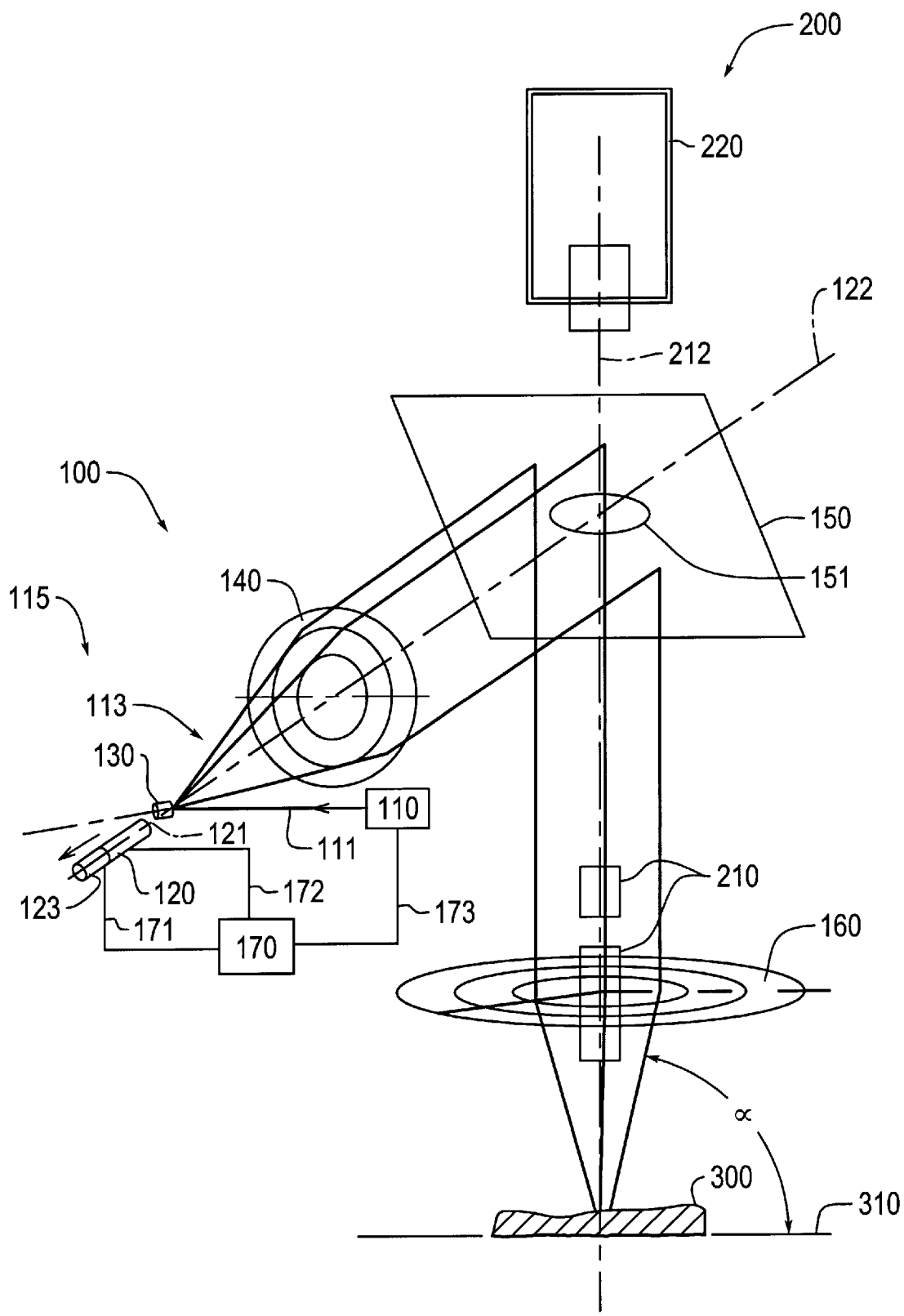
FIG. 1 is a schematic diagram of one exemplary embodiment of a diffuse lighting system according to this invention.

FIG. 1 is a schematic diagram of an exemplary diffuse illumination system 100 of this invention. The system 100 includes a light source 110 emitting a light beam 111, a light pattern controller 115, a collimator 140, a mirror 150, a focusing element 160 and a controller 170. The light pattern controller 115 includes a motor 120 and a beam deflector 130. FIG. 1 also shows an imaging system 200 that includes a camera 220 and an optical system 210 and that produces an image of a sample part 300. The system 100 illuminates the sample part 300 on an inspection plane 310 so that the imaging system 200 may obtain an image of the sample part 300.

The light source 110 has one or more solid-state light emitting devices that are stable and have a long service life.

The solid-state light emitting devices may include LEDs, laser diodes or any other known or later developed solid-state light emitting structure. Further, the solid-state light emitting devices may emit radiation in the visible and/or near-infrared regions of the electromagnetic spectrum. The solid-state light emitting devices are selected because they emit radiation in the spectral regions in which the charge coupled devices (CCDs) of the camera 220 are known to be photosensitive.

LEDs are also used as the solid-state light emitting devices because LEDs are more amenable to precise optical power regulation than halogen lamps. This is at least partially due to the smaller drive currents needed to operate the LEDs. In addition, the discrete nature of LEDs allows the wavelength of the emitted light to be more flexibly selected. Also, when driven electronically within the working parameters of the LEDs, the repeatability and reliability of the light output by the LEDs are both very high. In addition, some LEDs are capable of emitting light in the ultra-violet A frequency range, which improves the resolving power of imaging optics.

The light source 110 may have one or more optical power monitoring devices incorporated within the light source 110. Preferably, these devices are silicon photo-diodes whose spectral responsivity is matched to the spectral emission of the solid-state light emitting devices within the light source 110. These optical power monitoring devices are not restricted by material or design. Any known or later developed device capable of measuring the optical output of the solid-state light emitting devices within light source 110 can be used. In a configuration where the light source 110 can multiplex between different solid-state emitting devices that emit light of different illumination colors, each such solid-state light emitting device has a dedicated device to monitor optical power incorporated within light source 110.

As shown in FIG. 1, the light source 110 emits the light beam 111 that is incident on the beam deflector 130 of the light pattern controller 115. The beam deflector 130 is mounted on a shaft 121 of the motor 120 that is aligned with a transmitting axis 122. The beam deflector 130 tilts relative to the axis of the shaft 121 in proportion to the centrifugal force exerted on the beam deflector 130 when the motor shaft 121 rotates. As more clearly shown in FIG. 4, the light beam 111 from the light source 110 is directed onto a mirror 134 of the beam deflector 130 and is reflected from the mirror 134 at an angle that is defined by the tilt of the beam deflector 130.

Additionally, because the beam deflector 130 is rotating, the light beam 111 sweeps out a cone 113. The deflected light beam cone 113 is incident on the collimator 140 and sweeps out a circular pattern on the surface of the collimator 140. The collimator 140 may be, for example, a condenser lens, a Fresnel lens, or a set of reflective louvers, or any other known or later developed device capable of collimating the light cone 113. The radius of the circular pattern is dependent on both the distance of the collimator 140 from the beam deflector 130 and also the angle at which the light beam 111 is deflected by the beam deflector 130. The greater the angle of deflection and the farther the collimator 140 is from the beam deflector 130, the larger the circular pattern swept by the light beam 111 will be on the surface of the collimator 140. Therefore, since the deflection angle is directly proportional to the rotational speed of the motor shaft 121 and since the size of the circular pattern is directly proportional to the deflection angle, the size of the circular pattern is directly proportional to the rotational speed of the motor shaft 121.

Also, the speed at which the light beam 111 traverses the circular pattern is directly proportional to the rotational speed of the motor shaft 121. Therefore, the rotational speed of the motor shaft 121 controls both the size of the circular pattern and the speed with which the light beam 111 traverses the circular pattern. Thus, the light pattern controller 115 controls the pattern swept by the light beam 111 on the collimator 140.

The light cone 113 is collimated by the collimator 140 to sweep out a cylinder. The light cylinder is reflected by the mirror 150 to be substantially parallel to and to surround an optical axis 212 of the imaging system 200. The imaging system 200 employs optical lenses 210 to image a field of view located at an object plane onto the image plane of the camera 220. The collimated pattern is focused onto the same field of view using the focusing element 160.

The motor 120 may be a direct current motor (DC), an alternating current motor (AC) or a stepper motor. Any other known or later developed motor can also be used as the motor 120 to provide accurate rotational position and speed control information. Preferably, the speed control of the rotary motor should be better than 1%.

The mirror 150 is angled relative to the optical axis 212 and has an aperture 151 positioned where the optical axis 212 passes through the plane of the mirror 150. The aperture 151 is sized to permit unobstructed transmission of an image of the sample part 300 to the camera 220.

The cylinder of light is reflected by the mirror 150 toward the focusing element 160. The focusing element 160 can be a condenser lens, a Fresnel lens or the like. The focusing element 160 can also be a set of annular rings of mirrored louvers which are individually angled as a function of radius. The gradation in the angle of incidence of the light beam onto the sample part as a result of individual louvers or annular reflectors positioned at discrete radial locations in the focusing element 160 is discrete. It should be appreciated that any known or later developed element capable of collimating or focusing a light beam can also be used. It should also be appreciated that the collimator 140 may be identical to the focusing element 160.

The light beam 111 is directed by the focusing element 160 onto the sample part 300 on the inspection plane 310. The focusing element 160 has a focal distance which coincides with an average working distance of the objective lenses 210. For example, if the objective lenses 210 image at magnification levels of 1×, 3×, 5×, and 10× and have corresponding effective working distances of 59.0 mm, 72.5 mm, 59.5 mm, and 44.0 mm, respectively, with a resulting average working distance of 58.75 mm, then selecting a nominal focal length of approximately 59.0 mm for the focusing element 160 will coincide with the average working distance of the objective lenses 210 to yield good performance within the operational magnification range.

The controller 170 communicates with an encoder and/or tachometer 123 for the motor 120 over a signal line 171. The controller 170 receives angular position and/or speed data over the signal line 171 from the encoder and/or tachometer 123. The controller 170 also communicates with the motor 120 over a signal line 172. The controller 170 sends a drive signal to the motor 120 over the signal line 172. The controller 170 controls the phase and speed of the motor 120 by comparing the position and/or speed data received over the signal line 171 with predetermined position and/or speed values and makes changes to the drive signal sent to the motor 120 over the signal line 172 until the position and/or speed data received over the signal line 171 substantially match the desired values. The controller 170 controls the speed of the motor 120 in accordance with a desired angle of incidence.

The controller 170 also communicates with the light source 110 over a signal line 173. The controller 170 adjusts the on/off timing of the light source 110 based on the position and/or speed of the motor 120. The driving timing of the light source 110 is adjusted to the phase of the motor 120 to control the number of illumination sectors in an illumination field. The controller 170 also adjusts the drive timing of the light source 110 to determine the width of the illumination sector in the illumination field.

Figure 2:
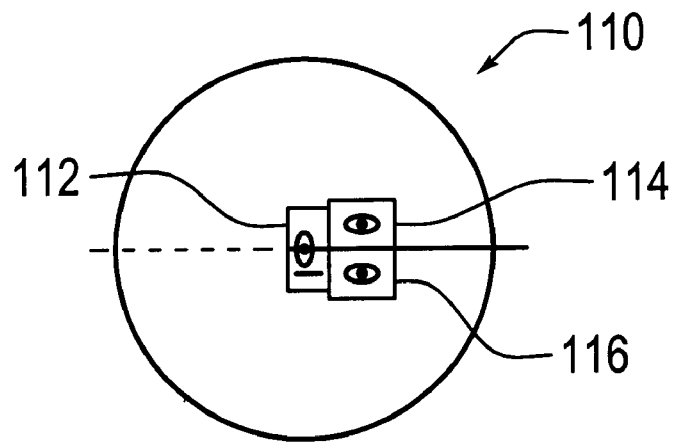
FIG. 2 is a plan view of one exemplary embodiment of a light source according to this invention.

As shown in FIG. 2, the light source 110 may include an array of solid-state devices 112, 114 and 116, each of which has different characteristics. In one exemplary embodiment, the LEDs 112–116 operate in the red, green and blue spectral regions, respectively. In another exemplary embodiment, the LEDs 112–116 can emit radiation in the near infrared or other spectral regions that are compatible with observing the sample part 300. A light source 110 having multiple solid-state devices can multiplex among the individual solid-state devices to optimally illuminate the sample part 300. In addition, a multi-wavelength addressable light source can match or avoid the average spectral absorption properties of the sample part 300 to enhance the image contrast.

Figure 3:
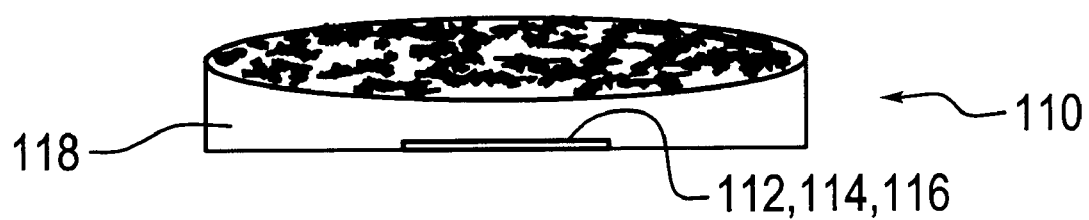
FIG. 3 is a perspective view of another exemplary embodiment of a light source according to an embodiment of this invention.

As shown in FIG. 3, the solid-state devices 112–116 may also be surface mounted in an acrylic-encapsulated package 118 to form the light source 110. For example, surface-mounted solid-state devices 112–116 can be combined with a collection and/or collimation lens to form the light source 110.

Figure 4:
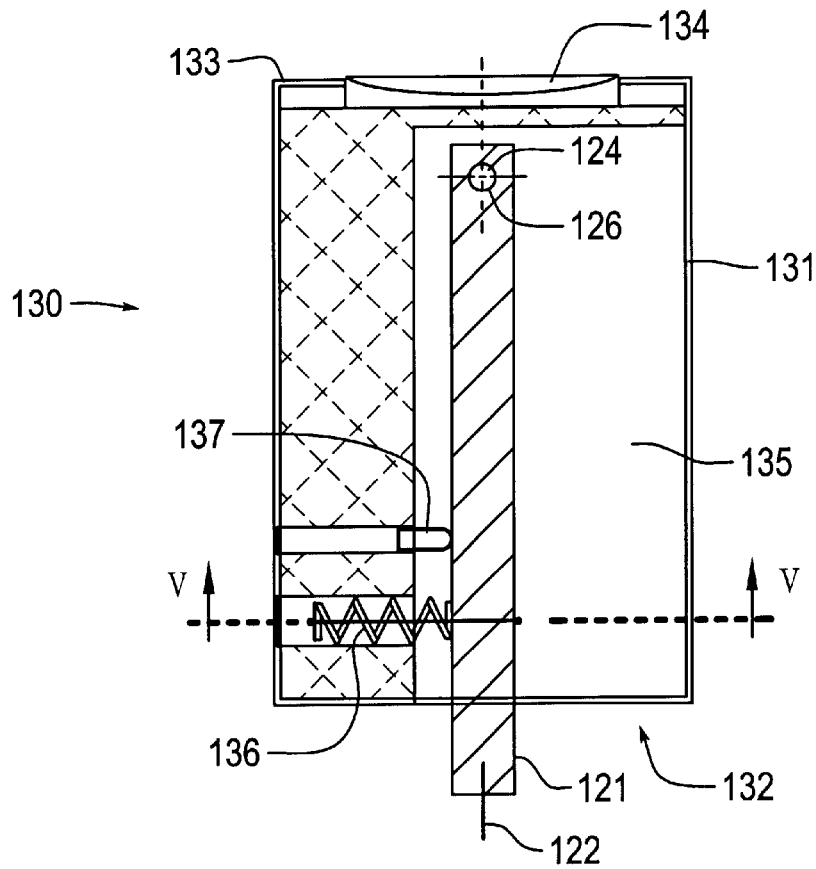
FIG. 4 is a sectional view of one exemplary embodiment of a beam deflector used to implement the light pattern controller according to this invention.

FIG. 4 shows a sectional view of a first exemplary embodiment of the light pattern controller 115 which includes the beam deflector 130 in accordance with this invention. As shown in FIG. 4, the beam deflector 130 deflects the light beam 111 from the light source 110. In this exemplary embodiment, the beam deflector 130 includes a cylindrically-shaped barrel 131 having a first end 132 and a second end 133. The mirror 134 is mounted on the second end 133. An internal cavity 135 of the beam deflector 130 defines an area in which the motor shaft 121 is received.

The motor shaft 121 is aligned with a transmitting axis 122. The motor shaft 121 also includes a hole 126 that accepts a clevis pin 124 about which the beam deflector 130 pivots.

As shown in FIG. 4, the center of mass of the beam deflector 130 is located to the left of the transmitting axis 122. Thus, when the motor shaft 121 rotates, a centrifugal force operates through the center of mass of the beam deflector 130 to push the center of mass away from the motor shaft 121.

A spring 136 within the beam deflector 130 counteracts the centrifugal force. Although the spring 136, as shown, provides a counteracting force, any known or later developed device for applying a counteracting force can be used with the beam deflector 130.

A position adjuster 137 is disposed within the cavity 135 of the barrel 131. The position adjuster 137 adjusts an angle between the longitudinal axis of the barrel 131 and the transmitting axis 122 of the motor shaft 121 within a predetermined range. In one exemplary embodiment, the adjuster 137 adjusts the angle such that the angle is substantially equal to zero when the angular velocity of the shaft 121 is below a threshold velocity $\omega_0$.

The mirror 134 shown in FIG. 4 is a concave spherical mirror having a center that is coincident with the transmitting axis 122. The mirror 134 may also be a planar or convex mirror. It should be understood that the mirror 134 may be any known or later developed reflector capable of reflecting electromagnetic radiation of the wavelengths emitted by the light emitting devices of the light source 110.

Figure 5:
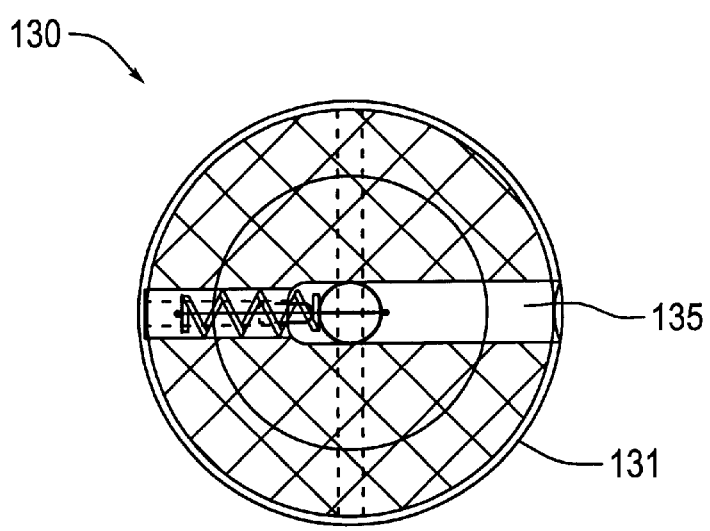
FIG. 5 is a sectional view of the beam deflector of FIG. 4 taken along line V—V.

FIG. 5 shows a sectional view of the beam deflector 130 taken through the line V—V in FIG. 4. The cavity 135 forms a transverse slot to permit the barrel 131 to pivot inside the cavity 135 about the clevis pin 124.

Accordingly, the beam deflector 130 generates two-dimensional circular patterns of light. The two-dimensional patterns of light have a variable radius that is a function of the angular velocity $\omega$ at which the beam deflector 130 rotates.

As discussed above, the mirror 134 reflects the light output by the solid-state light emitting devices of the light source 110. Furthermore, the focal length of the mirror 134 is chosen to provide a light beam having a predetermined diameter. The focal length of the mirror 134 is also chosen based on the performance of the light source 110. The diameter of the light beam 111 incident on the inspection plane 310 is chosen to provide adequate image brightness and field of view-conformity. For example, a mirror 134 having a diameter of approximately 12.5 mm can be used to provide a focal length of approximately 12 mm to 40 mm. The focal length of the mirror 134 is chosen to provide the clearest image of the sample part 300. The direction and/or divergence of the light beam 111 must be taken into consideration when choosing the mirror 134.

As discussed above, after the light beam 111 reflects off the mirror 150, the light beam 111 must be redirected onto the sample part 300. The focusing element 160 redirects the light beam 111 onto the sample part 300.

Figure 6:
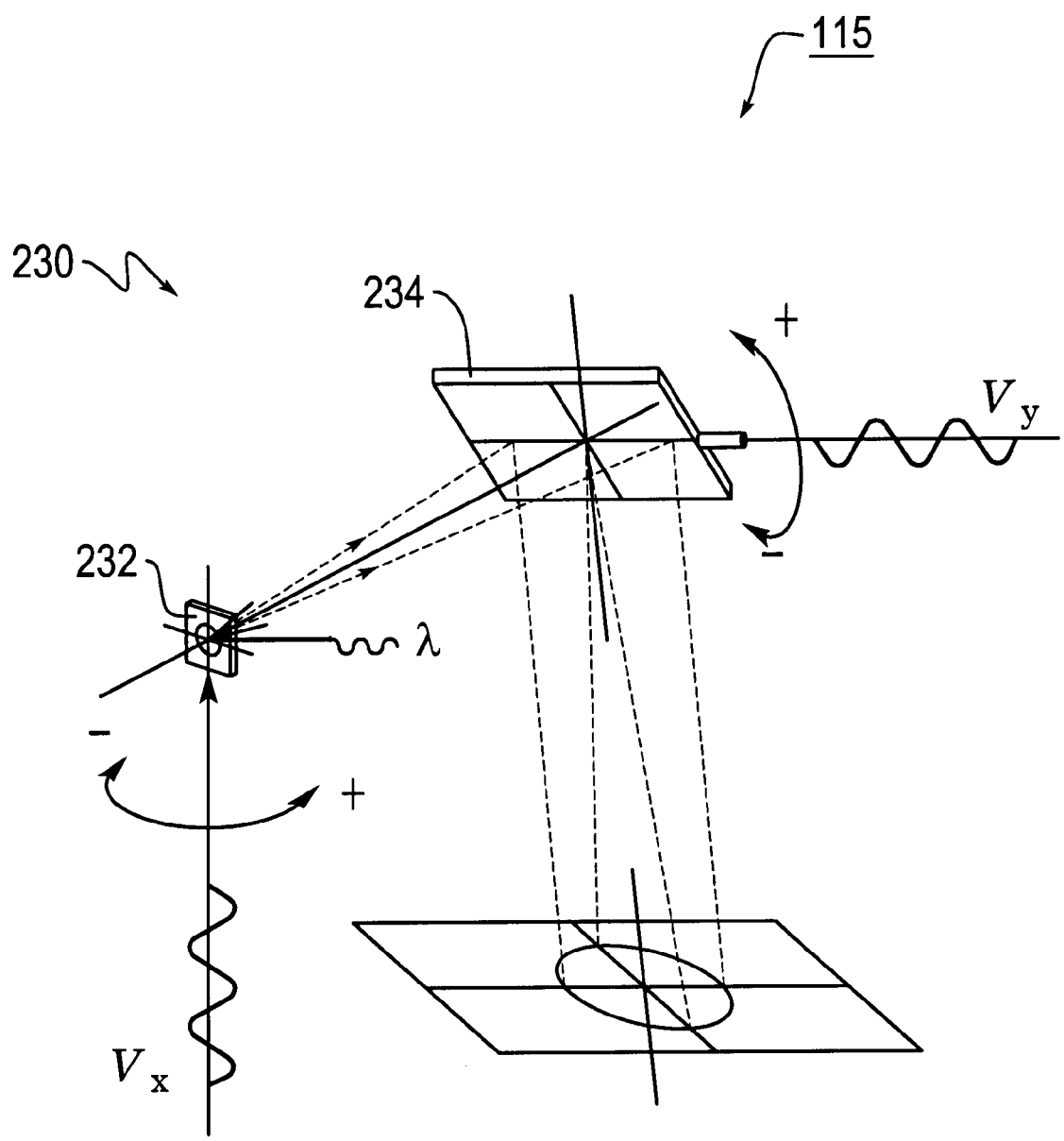
FIG. 6 shows another exemplary embodiment of a light pattern controller according to this invention.

FIG. 6 shows a second exemplary embodiment of the light pattern controller 115 which includes a second beam deflector 230 in accordance with this invention. As shown in FIG. 6, the second beam deflector 230 is a two-dimensional scanning galvanometer, and includes two angular scanning galvanometers 232 and 234. The scan axes of the two angular scanning galvanometers 232 and 234 are orthogonal to each other. To achieve illumination symmetry about the optical axis 122, the swept pattern is made circular. This circular pattern is created using the two angular scanning galvanometers 232 and 234. A circular pattern is created by input drive signals $V_x$ and $V_y$ that are input to the scanning galvanometers 232 and 234, respectively. The two scanning input drive signals are sinusoidal wave-forms described by:

$$V_x = A_x \sin(2\pi f_x t + \theta_x); \text{ and} \tag{1}$$

$$V_y = A_y \sin(2\pi f_y t + \theta_y). \tag{2}$$

where:
$A_x$ is the maximum amplitude of the sinusoidal input drive signal $V_x$;
$A_y$ is the maximum amplitude of the sinusoidal input drive signal $V_y$;
$\theta_x$ is the phase angle of the sinusoidal input drive signal $V_x$ with respect to a reference sine wave;
$\theta_y$ is the phase angle of the sinusoidal input drive signal $V_y$ with respect to $V_x$;
$f_x$ is the angular scanning frequency of the x-axis galvanometer 232; and
$f_y$ is the angular scanning frequency of the y-axis galvanometer 234. It should be appreciated that the sinusoidal input drive signal $V_x$ is designed to follow the reference sine wave faithfully with zero phase difference.

The scanning galvanometers 232 and 234 each tilts an amount from a rest position that corresponds to the amplitude of the corresponding drive signal $V_x$ or $V_y$. In particular, the scanning galvanometers 232 and 234 are positioned so that, when scanning galvanometers 232 and 234 are at their rest positions, the light beam from the light source 110 will be collinear with the optical axis 212. That is, the angle of incidence on both the X and Y axis will be zero. Thus, when the drive signal $V_x$ or $V_y$ has a zero amplitude, the corresponding scanning galvanometer 232 or 234 will have a zero tilt amount, i.e., a zero tilt angle, relative to the corresponding rest position. In contrast, when the drive signal $V_x$ or $V_y$ has the corresponding maximum amplitude $A_x$ or $A_y$, the corresponding scanning galvanometer 232 or 234 will have a maximum tilt amount or tilt angle relative to the corresponding rest position.

The scanning galvanometers 232 and 234 are driven with sinusoidal drive signals $V_x$ or $V_y$ having a sine and cosine relationship. Therefore, the pattern created by driving the two angular scanning galvanometers 232 and 234 with these sinusoidal drive signals $V_x$ or $V_y$ will have an angle of incidence on the sample part 300 that is a function of the maximum amplitudes $A_x$ and $A_y$. If the maximum amplitudes $A_x$ and $A_y$ are the same, the pattern will be circular and the angle of incidence of the pattern will not vary as the pattern is swept by the scanning galvanometers 232 and 234. If the maximum amplitudes $A_x$ and $A_y$ are not the same, the pattern will be elliptical, or some other shape if the maximum amplitudes $A_x$ and $A_y$ also vary over time, and the angle of incidence of the pattern will vary as the pattern is swept by the scanning galvanometers 232 and 234

Additionally, to obtain a syrnmetric, circular pattern, the input wave-forms must be controlled such that:

$$(\theta_x - \theta_y) = \pi/2, 3\pi/2 \qquad (3)$$

The drive frequencies $f_x$ and $f_y$ are controlled to provide the proper number of circular sweep cycles per video field integration in the CCD of the camera 200. A minimum execution of two whole sweep cycles per field integration will minimally assure meeting the Nyquist criteria of the camera 220. Further, all sweep cycles per field integration should be whole numbers to ensure that interlaced fields produce spatially similar illumination patterns in assembled frames. The drive frequencies are controlled according to:

$$f_x = f_y \qquad (4)$$

where:

$$f_{min} \leq f_i \leq f_{resonant} \qquad (5)$$

In the case of an RS 170 camera with interlaced fields, $f_{min}$ is twice as fast as the overlap time period between odd and even fields. This overlap period is 16⅔ msec. Therefore, $f_{min}$ would correspond to a sweep rate occurring at least 2 times within this period or every 8⅓ msec (120 Hz). Choice of the XY scanner and the inertia of each mirror restrict the upper limit, $f_{resonant}$. Input of equivalent drive frequencies meets the final requirement for a symmetric, circular sweep pattern.

The amplitude of each wave-form is also controlled based on the angle of incidence α which is desired by the user. Essentially, the wave-form amplitudes are chosen such that:

$$A_x = A_y \qquad (6)$$

where $A_i$ represents the maximum, or peak, amplitude, and thus defines the sweep circle radius, for each specific desired angle of illumination incidence α. This radius or amplitude is selectable within the mirror scan angle range $\zeta_i$, where $\zeta_{max} \leq \zeta_i \leq +\zeta_{max}$. As a result, the diameter of the circularly scanned pattern is controlled by the choice of wave-form amplitudes.

In one exemplary embodiment of the control systems of this invention, a lookup table is used to translate the angle of incidence to the input voltage values for the scanning galvanometer. As discussed with respect to the above outlined parameters, illumination conditions selected by the user dictate the specific input settings to each scanner axis.

Additionally, it should be understood that the angle of incidence can vary by sector. For example, the motor 120 may be controlled to operate at a speed which varies such that the light beam circumscribes an ellipse on the collimator 140 rather than circumscribing a circle. In this instance, the controller 170 may select a pulse repetition frequency and phase angle which places the light beam on the illumination field at angles of incidences which vary across sectors. Similarly, the two dimensional scanning galvanometer 230 may be controlled to vary the angle of incidence over time and in different sectors.

It should be understood that, while a beam deflector and a two-dimensional scanning galvanometer have been described in detail above, any known or later developed apparatus or structure for and/or method of sweeping a light pattern onto a surface of a collimator may be used.

Figure 7:
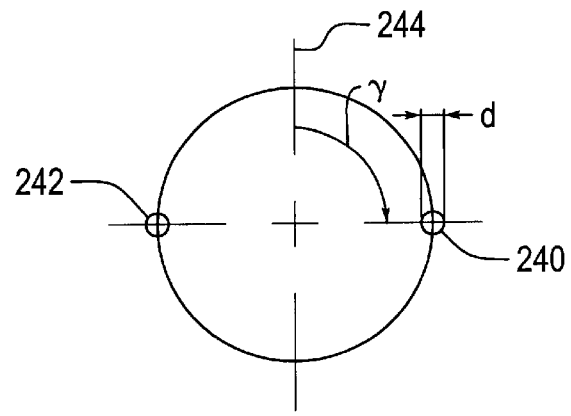
FIG. 7 is a plan view of a first exemplary illumination field in time elapse at the final focusing element.
Figure 10:
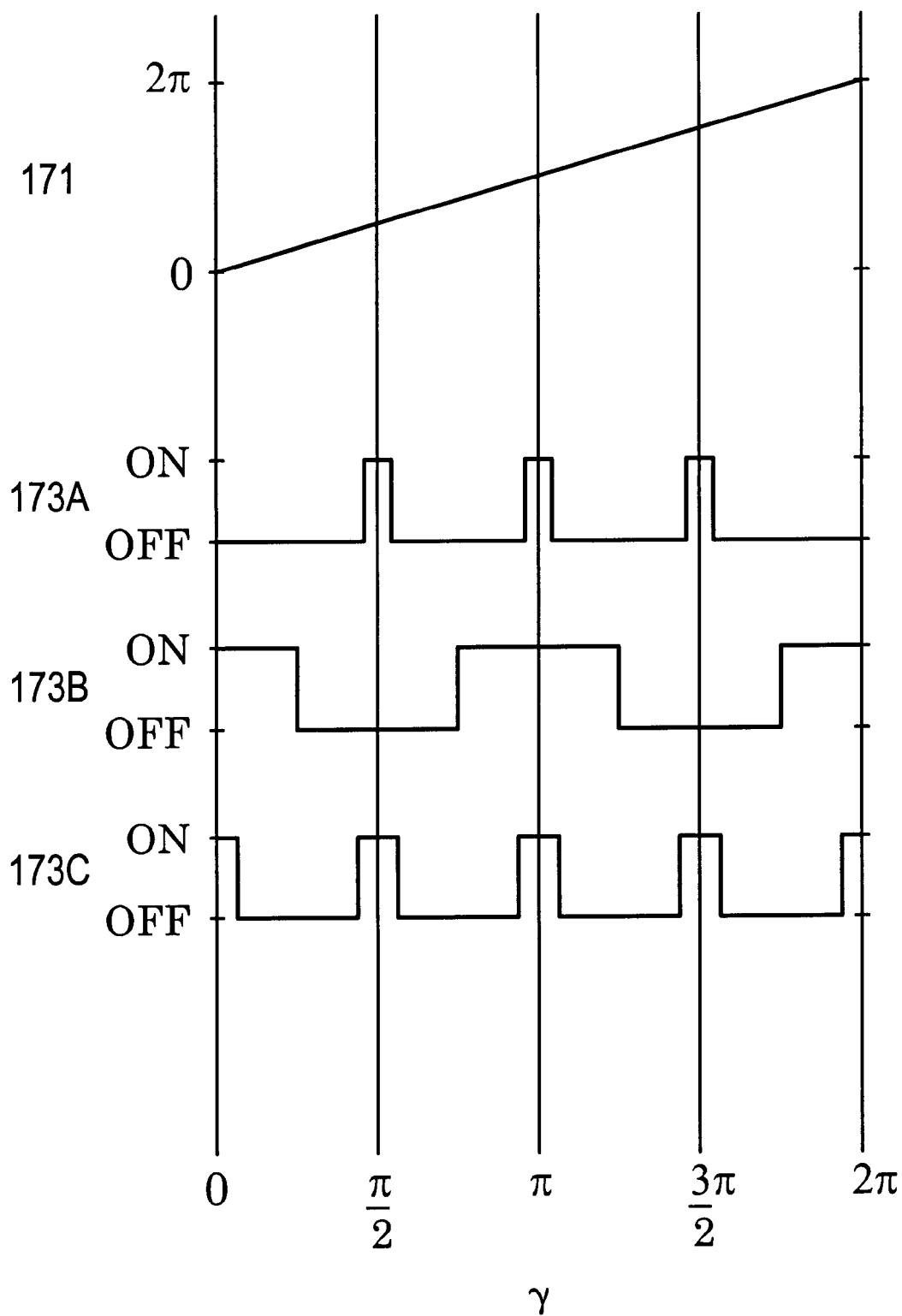
FIG. 10 is a timing diagram according to this invention.

FIG. 7 shows one exemplary illumination field in time elapse at the plane of the focusing element 160 illuminated by any exemplary embodiment of the systems and methods of this invention. FIG. 10 shows a timing diagram for the encoder signal received on the signal line 171 and a drive signal 173A that generates the illumination field shown in FIG. 7 output by the controller 170 to the light source 110. The controller 170 synchronizes the modulation or drive signal 173A output over the signal line 173 to the light source 110 with the rotational position of the beam deflector 130 or 230, as indicated by the encoder signal 171, to form the illuminated areas 240 and 242. Here, the drive signal 173A output to the light source 110 is modulated in a pulsed mode. There are two illuminated areas 240 and 242 because the timing of the drive signal to the light source 110 is set at a pulse repetition frequency that is twice the angular frequency of the beam deflector 130 or 230. As shown in FIG. 10 a pulse occurs at a position γ of π/2 and 3π/2 as determined by the encoder signal on signal line 171.

Alternatively, the drive signal output to the light source 110 could be modulated in a continuous wave (cw) mode. For example, the drive signal output to the light source 110 could be modulated as a sinusoid, triangle sawtooth, or other desired waveform. The illuminated areas 240 and 242 are circular because the light source 110 is driven in a pulsed mode to illuminate the sample part 300 for an instant in time, i.e., at a low duty cycle. The illuminated area 240 is at a phase angle γ of π/2 radians and the illuminated area 242 is at a phase angle γ of 3π/2 radians relative to the datum position 244 for the beam deflector.

Figure 8:
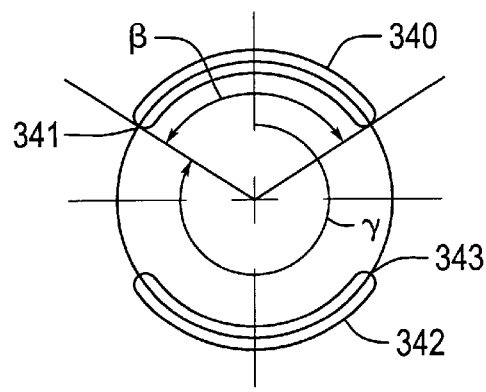
FIG. 8 is a plan view of a second exemplary illumination field in time elapse at the final focusing element.

FIG. 8 shows a second exemplary illumination field in time elapse at the plane of the focusing element 160 illuminated by any exemplary embodiment of the control systems and methods of this invention. FIG. 10 shows a timing diagram for the encoder signal received on the signal line 171 and a drive signal 173B that generates the illumination field shown in FIG. 8 output by the controller 170 to the light source 110. The controller 170 synchronizes the modulation or the drive signal 173B output over the signal line 173 to the light source 110 with the rotational position of the beam deflector 130 or 230, as indicated by the encoder signal 171, to form the illuminated areas 340 and 342.

The timing of the drive signal 173B to the light source 110 is at a pulse repetition frequency which is twice the angular frequency of the light position controller. In this example, the drive signal 173B output to the light source 110 is a square wave. As shown in both FIGS. 8 and 10, the leading edges 341 and 343 of the illuminated areas 340 and 342 are positioned at the phase angles γ of 7π/4 and 3π/4 radians, respectively, relative to the datum point 244. The angular frequency of the light position controller 115 together with the duty cycle of the light source 110 determines the arc length β of the illuminated areas 340 and 342.

Figure 9:
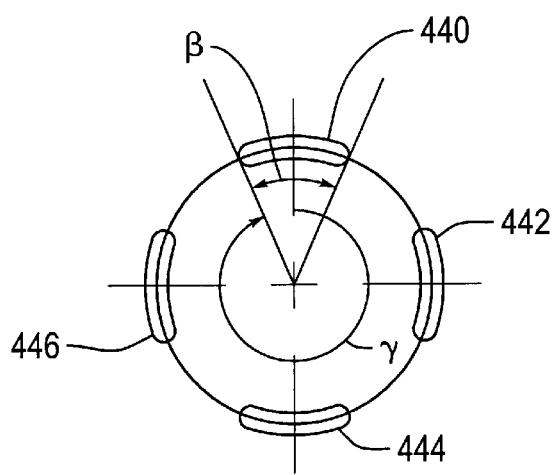
FIG. 9 is a plan view of a third exemplary illumination field in time elapse at the final focusing element.

FIG. 9 shows a third exemplary illumination field in time elapse at the plane of the focusing element 160 illuminated by any exemplary embodiment of the control systems and methods of this invention. FIG. 10 shows a timing diagram for the encoder signal received on the signal line 171 and a drive signal 173C that generates the illumination field shown in FIG. 9 output by the controller 170 to the light source 110. The controller 170 synchronizes the modulation or the drive signal 173C output over the signal line 173 to the light source 110 with the rotational position of the beam deflector 130 or 230, as indicated by the encoder signal 171, to form the illuminated areas 440, 442, 444 and 446. The illumination field of FIG. 9 has four illumination areas because the pulse repetition frequency of the light source 110 is four times the rotational frequency of the beam deflector 130 or 230. The arc length β of the illuminated areas 440, 442, 444 and 446 is approximately half the arc lengths β of the illuminated areas 340 and 342 shown in FIG. 8 because the duty cycle for the illuminated areas 440–446 is approximately half that of the illuminated areas 340 and 342.

In another exemplary embodiment of the systems and methods of this invention, the illumination field may be illuminated by a different color for each sector. For example, the illumination area 440 may be illuminated using a red light beam, illumination area 442 may be illuminated using a green light beam, illumination area 444 may be blue and illumination area 446 may be illuminated using a light beam having yet another color. It should be understood that the hue and intensity of the color of the light beam emitted by any particular solid-state light emitting device can be controlled by the controller 170 and may be varied by sector and/or by time.

In operation, a desired phase angle, γ; a desired arc length, β; and a desired angle of incidence, α are input to the controller 170. In response, the controller 170 sends a drive signal over the signal line 172 to the motor 120 to drive the motor 120 at a rotational speed ω which provides the desired angle of incidence of α. The controller 170 also outputs a modulated drive signal over the signal line 173 to the light source 110 to drive the solid-state light emitting devices of the light source 110 at a pulse repetition frequency, pulse width, i.e., duty cycle, and phase angle that cause the emitted light beams to illuminate the sample part 300 at the desired phase angle γ and over the desired arc length β.

Figure 11:
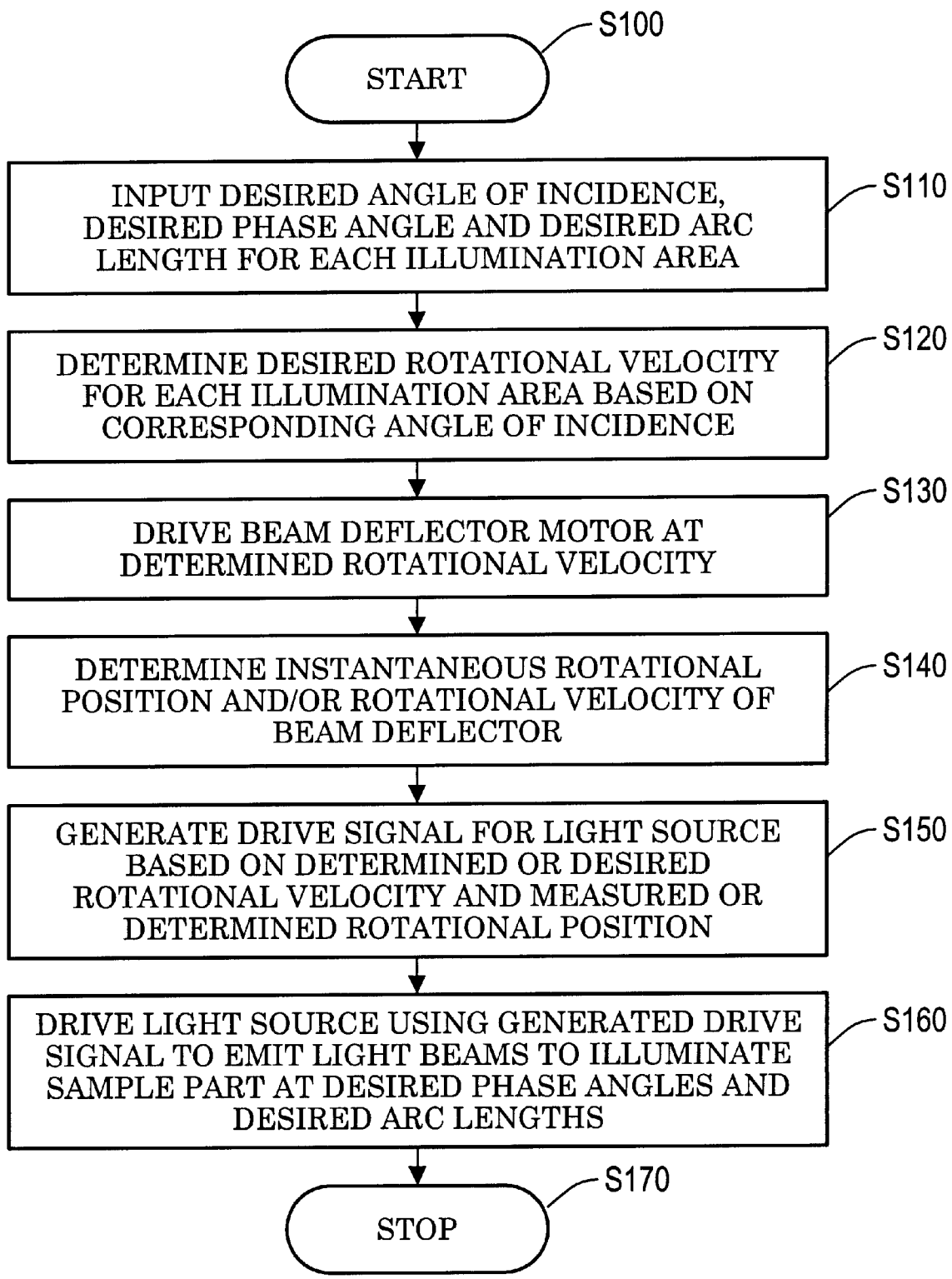
FIG. 11 is a flowchart outlining one exemplary embodiment of the control methods according to this invention.

FIG. 11 is a flow chart outlining one exemplary embodiment of the control methods of this invention. Beginning in step S100, control continues to step S110, where a desired phase angle γ of the leading edge of each illuminated area, a desired arc length β of each illuminated area, and a desired angle of incidence α of each illuminated area are input. Next, in step S120, the desired rotational velocity ω at which the motor will provide the desired angles of incidence is determined. Then, in step S130, the motor is driven to rotate at the determined rotational velocity ω that provides the desired angles of incidence α input in step S110. Control then continues to step S140.

In step S140, the instantaneous position, and or the instantaneous rotational velocity, of the motor is determined. Then, in step S150, the drive signal for the light source is generated based on either the measured rotational velocity or the desired motor velocity ω, and on either a determined motor position or the measured motor position. Next, in step S160, the light source is driven using the generated drive signal to emit a light beam to illuminate the sample part at the desired phase angle γ and over the desired arc length β for each illuminated area. In particular, the drive signal is output at a time when the beam deflector is in the proper rotational position to create an illumination area having the corresponding desired phase angle γ and the corresponding desired arc length γ. Then, in step S170, the control routine stops.

Figure 12:
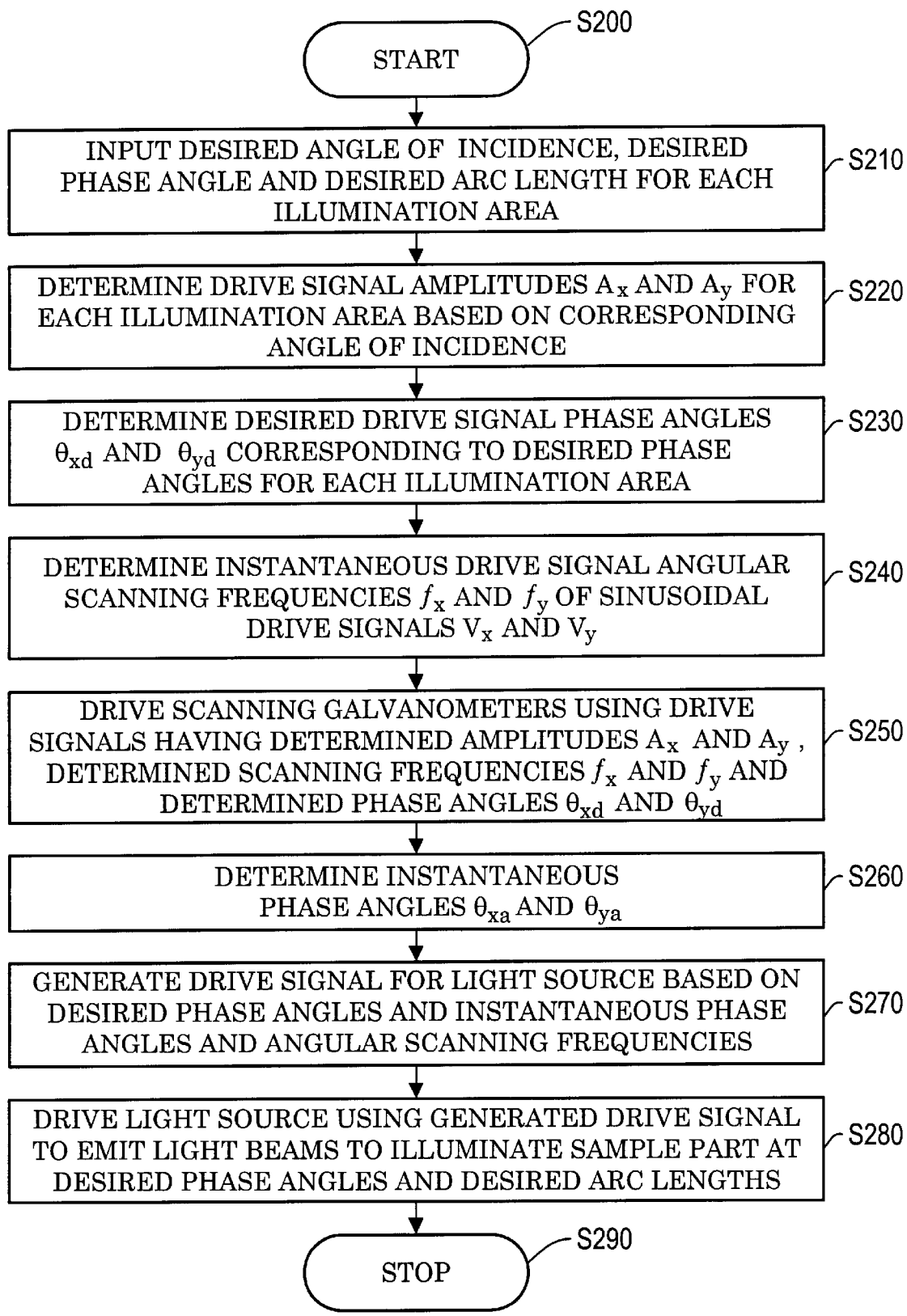
FIG. 12 is a flowchart outlining another exemplary embodiment of the control methods according to this invention.

FIG. 12 is a flow chart outlining another exemplary embodiment of the control methods of this invention. Beginning in step S200, control continues to step S210, where a desired phase angle γ of the leading edge of each illuminated area, a desired arc length β of each illuminated area, and a desired angle of incidence α of each illuminated area are input. Next, in step S220, the amplitudes $A_x$ and $A_y$ for the drive signals $V_x$ and $V_y$ input to the scanning galvanometers necessary to obtain the desired angles of incidence α are determined. Then, in step S230, the desired drive signal phase angles $\theta_{xd}$ and $\theta_{yd}$ of the sinusoidal input drive signals $V_x$ and $V_y$ are determined. For example, a 90° phase difference is one prerequisite for a circular pattern. Other phase differences will produce non-circular patterns. Control then continues to step S240.

In step S240, the drive signal scanning frequencies $f_x$ and $f_y$ of the sinusoidal input drive signals $V_x$ and $V_y$ are determined. As another example, an additional prerequisite for a circular pattern would be equivalent scanning frequencies. Next, in step S250, the scanning galvanometers are driven using the drive signals $V_x$ and $V_y$, which are based on the previously determined desired phase angles $\theta_{xd}$ and $\theta_{yd}$, the amplitudes $A_x$ and $A_y$, and the drive signal scanning frequencies $f_x$ and $f_y$. Then, in step S260, the instantaneous phase angles $\theta_{xa}$ and $\theta_{ya}$ of the sinusoidal input drive signals $V_x$ and $V_y$ are determined. This provides the instantaneous rotational position relative to the datum position 244 of FIG. 7. Control then continues to step S270.

In step S270, the drive signal for the light source is generated based on the desired phase angles $\theta_{xd}$ and $\theta_{yd}$, the instantaneous phase angles $\theta_{xa}$ and $\theta_{ya}$, and the scanning frequencies $f_x$ and $f_y$. Next, in step S280, the light source is driven using the generated drive signal to emit a light beam to illuminate the sample part at the desired phase angle γ and over the desired arc length β. In particular, the drive signal is output at a time when the scanning galvanometers are in the proper positions to create an illumination area having the desired phase angle γ and the desired arc length β. Then, in step S290, the control routine stops.

Figure 13:
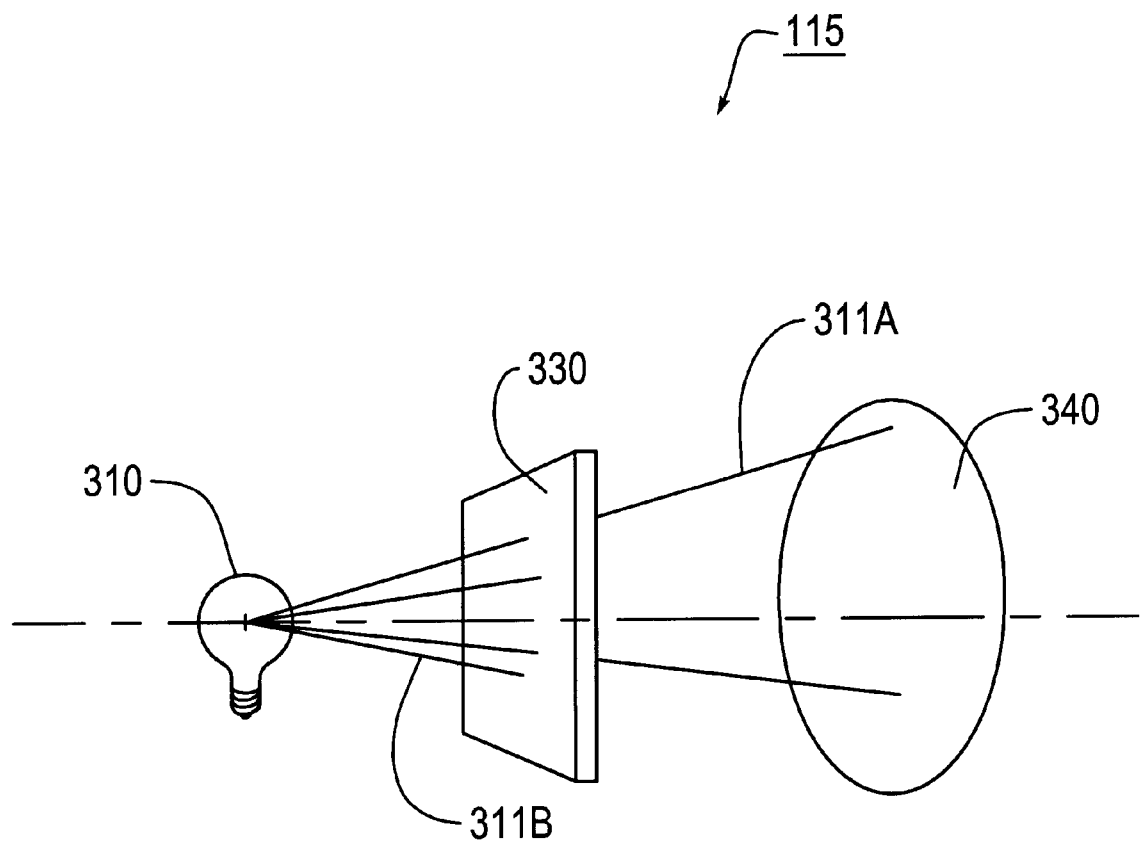
FIG. 13 shows another exemplary embodiment of light pattern controller according to this invention.

FIG. 13 shows another exemplary embodiment of the light pattern controller 115. As shown in FIG. 13, in this exemplary embodiment, the light pattern controller 115 includes a liquid crystal device 330. In particular, the liquid crystal light pattern controller 330 is a transmitting type liquid crystal device, or a liquid crystal shutter. The light source 310 emits light which impinges on the liquid crystal light pattern controller 330. The liquid crystal light pattern controller 330 includes an array of addressable sectors that are controllable to block portions of the light from the source 310 from impinging on the collimator 340. For example, a light ray 311A impinges on the liquid crystal light pattern controller 330 and passes through to impinge on and be collimated by the collimating element 340. By contrast, a light ray 311B impinges on the liquid crystal light pattern controller 330 but is blocked. Thus, the light ray 311B is prevented from passing through and impinging on the collimator 340. Therefore, the liquid crystal light pattern controller 330 controls the pattern of light from the light source 310 that impinges on the collimator 340.

It should be appreciated that the addressable sectors of the exemplary liquid crystal device 330 can be in any desired shape, such as a square pixel-like shape or an arcuate sector-like shape. It should also be understood that the liquid crystal device may also include an array of addressable pixels as the array of addressable sectors and may also operate in a reflective mode rather than the transmissive mode described above.

Figure 14:
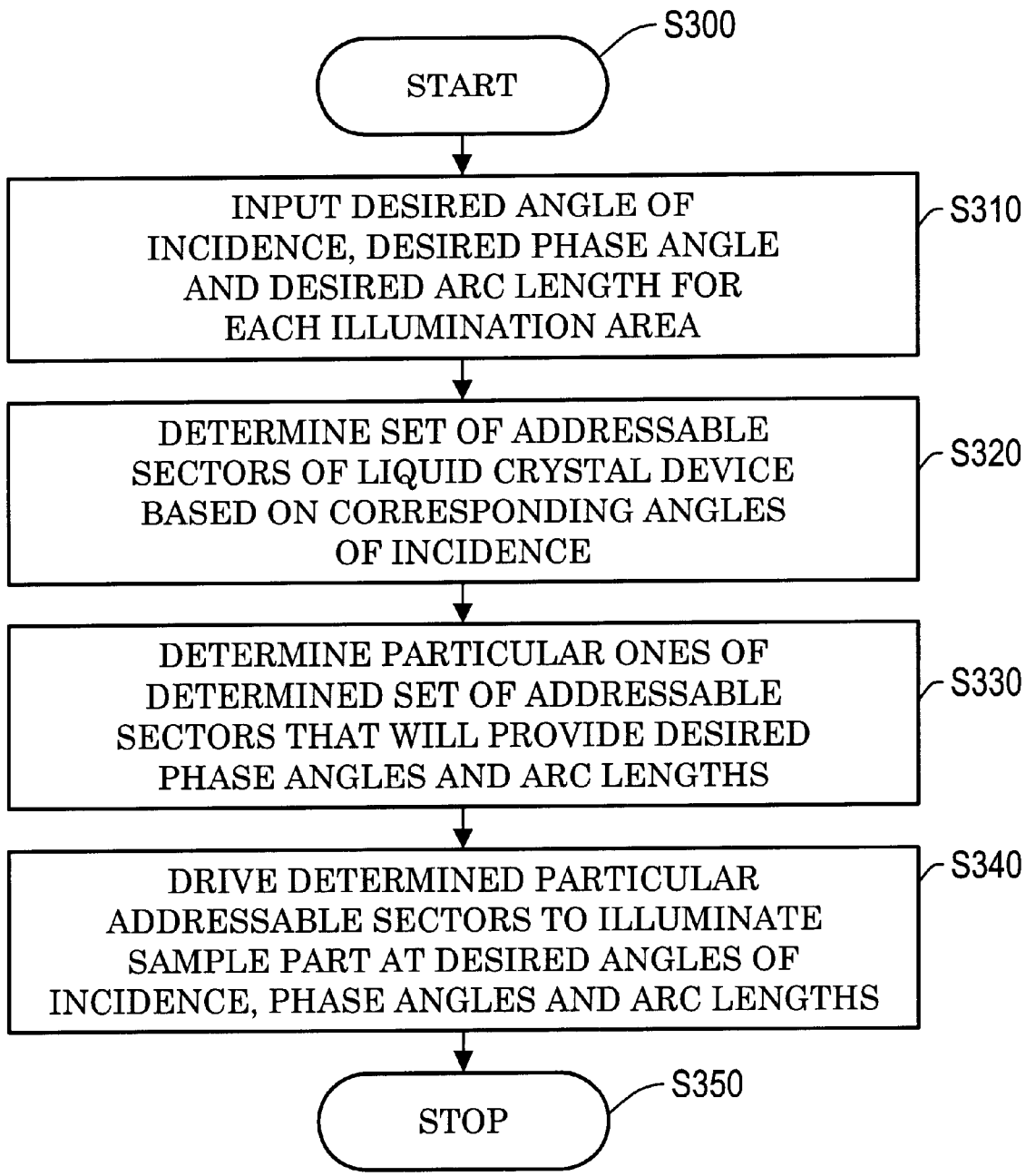
FIG. 14 is a flowchart outlining another exemplary embodiment of the control methods according to this invention.

FIG. 14 is a flow chart outlining another exemplary embodiment of the control methods of this invention. Beginning in step S300, control continues to step S310, where a desired positional phase angle γ of the leading edge of each illuminated area, a desired arc length β of each illuminated area, and a desired angle of incidence α of each illuminated area are input. Next, in step S320, the ring of addressable sectors of the liquid crystal light pattern controller that will provide the desired angles of incidence α for the illuminated areas is determined. Then, in step S330, the particular ones of the determined ring of addressable sectors that will provide the desired positional phase angles γ and arc lengths β of each of the illuminated areas are determined. Control then continues to step S340.

In step S340, the determined particular ones of the addressable sectors are activated to either pass the light incident on the liquid crystal light pattern controller, if the liquid crystal light pattern controller is a liquid crystal shutter, or to reflect the light incident on the liquid crystal light pattern controller, if the liquid crystal light pattern controller is a reflective liquid crystal device, to the collimator. Then, in step S350, the control routine stops.

While the description set forth above refers generally to light being emitted from a light source having a solid-state light emitting device, it should be understood that this invention may also have a more conventional light source such as a tungsten halogen lamp. Additionally, it should be understood that the light source of this invention may also emit radiation outside of the visible spectrum in useful spectral regions capable of being sensed. Specifically, these spectral regions include the ultra-violet A and near infra-red portions of the spectrum. This invention also controls the light source to emit a continuous wave light beam, a modulated light beam and a pulsed light beam.

While this invention has been described in conjunction with the specific embodiments outlined above, it is evident that many alternatives, modifications and variations are apparent to those skilled in the art. Accordingly, the embodiments of the invention as set forth above are intended to be illustrative and not limiting. Various changes may be made without departing from the spirit and scope of the invention.

What is claimed is:

1. An apparatus for controllably illuminating a sample diffusely, the apparatus comprising:

a light pattern generation system that controllably generates a pattern of light, the pattern of light having at least one illumination area, each illumination area having at least one of an angle of incidence, a positional phase angle and an arc length;

a collimator that receives and collimates the pattern of light;

a focusing element that focuses the collimated pattern of light onto a sample; and a controller that controls the light pattern generation system to generate the pattern of light.

2. The apparatus of claim 1, wherein the light pattern generation system comprises a light pattern generator and a light source outputting light to the light pattern generator.

3. The apparatus of claim 2, wherein the light pattern generator is a beam deflector that deflects light output by the light source.

4. The apparatus of claim 3, wherein:

the beam deflector comprises a rotating mirror tiltably mounted on a shaft of a motor; and the controller controls an angle of incidence of each illumination area by outputting a drive signal profile to the motor to drive the motor at a rotational velocity corresponding to the angle of incidence of that illumination area.

5. The apparatus of claim 3, wherein:

the beam deflector comprises a pair of galvanometers; and the controller controls an angle of incidence of each illumination area by outputting a pair of drive signals to the pair of galvanometers to drive the pair of galvanometers at tilt angles corresponding to the angle of incidence of that illumination area.

6. The apparatus of claim 3, wherein:

the light source includes at least one controllable light emitting structure;

the controller outputs a modulated drive signal to each controllable light emitting structure to apply a modulation to an emitted light beam; and the positional phase angle and arc length of each illumination area corresponds to the modulation of the light beam.

7. The apparatus of claim 6, wherein:

the light source includes at least one solid-state light emitting structure; and the controller controls a positional phase angle and an arc length of each illumination area by outputting a drive signal to each of at least one solid-state light emitting structure.

8. The apparatus of claim 6, wherein:

the beam deflector comprises a pair of galvanometers scanning at a pair of frequencies;

the light source includes at least one solid-state light emitting structure;

the controller outputs a modulated drive signal to each solid-state light emitting structure to modulate the emitted light beam based on the scanning frequencies and relative phase; and the positional phase angle and arc length of each illumination area is based on the modulated light beam.

9. The apparatus of claim 3, wherein:

the beam deflector comprises a rotating mirror tiltably mounted on a shaft of a motor rotating at a rotational velocity;

the light source includes at least one solid-state light emitting structure; and the controller outputs a modulated drive signal to each solid-state light emitting structure, each modulated drive signal driving a corresponding solid-state light emitting structure to output a light beam and to modulate the light beam based on the rotational positions corresponding to the positional phase angle and arc length of each illumination area.

10. The apparatus of claim 2, wherein:
the light source includes at least one controllable light emitting structure;
the controller outputs a modulated drive signal to each controllable light emitting structure to output a modulated light beam; and
the positional phase angle and arc length of each illumination area is based on the modulated light beam.

11. The apparatus of claim 2, wherein:
the light source includes at least one solid-state light emitting structure; and
the controller controls a positional phase angle and an arc length of each illumination area by outputting a drive signal to each at least one solid-state light emitting structure to drive the at least one solid-state light emitting structure corresponding to the positional phase angle and arc length of that illumination area.

12. The apparatus of claim 2, wherein:
the light source outputs light;
the light pattern generator is a liquid crystal device having a plurality of selectable areas; and
the controller selectively activates the plurality of selectable areas to form the pattern of light.

13. The apparatus of claim 12, wherein the controller selectively activates the plurality of selectable areas based on the angle of incidence, positional phase angle and arc length of each illuminated area of the pattern of light.

14. The apparatus of claim 12, wherein each selectable area, when activated, transmits the light output by the light source.

15. The apparatus of claim 12, wherein each selectable area, when activated, does not transmit the light output by the light source.

16. The apparatus of claim 12, wherein each selectable area, when activated, reflects the light output by the light source.

17. The apparatus of claim 12, wherein each selectable area, when activated, does not reflect the light output by the light source.

18. The apparatus of claim 2, wherein the light source includes at least one solid-state light emitting structure.

19. The apparatus of claim 18, wherein each at least one solid-state light emitting structure is one of an LED and a laser diode.

20. The apparatus of claim 18, wherein:
the light source includes a plurality of solid-state light emitting structures; and
each solid-state light emitting structure emits light at a different wavelength.

21. The apparatus of claim 20, wherein the controller drives the plurality of solid-state light emitting structures to vary the wavelengths of the light beams based on an operational state of the light pattern generator.

22. The apparatus of claim 21, wherein the operational state of the light pattern generator is one of:
a rotational position when the light pattern generator includes a rotating mirror;
a drive signal phase angle when the light pattern generator includes a pair of scanning galvanometers; and
a configuration of selected areas when the light pattern generator is a liquid crystal device having a plurality of selectable areas.

23. The apparatus of claim 1, wherein the controller drives a solid-state light emitting structure to vary the wavelength of the light beam based on an operational state of a light pattern generator.

24. The apparatus of claim 23, wherein the operational state of the light pattern generator is one of:
a rotational position when the light pattern generator includes a rotating mirror;
a drive signal phase angle when the light pattern generator includes a pair of scanning galvanometers; and
a configuration of selected areas when the light pattern generator is a liquid crystal device having a plurality of selectable areas.

25. The apparatus of claim 1, wherein the pattern is one of elliptical and circular.

26. The apparatus of claim 1, wherein the sample reflects the light beam, the apparatus further comprising a light sensing device that senses the reflected light beam from the sample and outputs an image of the sample.

27. The apparatus of claim 26, wherein the light sensing element comprises one of a monochrome CCD array and a color CCD array.

28. The apparatus of claim 1, wherein the apparatus is operably positioned relative to an imaging system such that the collimated pattern of light is transmitted along a zone generally surrounding an optical axis of the imaging system.

29. A method for controllably illuminating a sample diffusely, the method comprising:
controllably generating a pattern of light, the pattern of light having at least one illumination area, each illumination area having at least one of an angle of incidence, a positional phase angle and an arc length;
collimating the pattern of light; and
focusing the collimated pattern of light onto the sample.

30. The method of claim 29, wherein controllably generating a pattern of light comprises:
outputting light onto a beam deflector;
controlling an operational state of the beam deflector; and
modulating the light output by the light source based on the operational state of the beam deflector.

31. The method of claim 30, wherein:
the beam deflector comprises a rotating mirror tiltably mounted on a shaft of a motor; and
controlling an operational state of the beam deflector comprises controlling a rotational velocity of the motor.

32. The method of claim 31, wherein modulating the light beam output by the light source based on the operational state of the beam deflector comprises:
determining a rotational position of the mirror;
determining desired rotational positions of the mirror for each illuminated area based on the positional phase angle and arc length for that illuminated area; and
modulating the light beam based on the desired and determined rotational positions of the mirror.

33. The method of claim 31, wherein:
the beam deflector comprises a pair of galvanometers;
controlling an operational state of the beam deflector comprises controlling a tilt angle of each of the pair of galvanometers.

34. The method of claim 33, wherein modulating the light beam output by the light source based on the operational state of the beam deflector comprises:
determining desired drive signal phase positions for the drive signals for the pair of galvanometers for each illuminated area based on the positional phase angle and arc length for that illuminated area;
modulating the light beam based on the drive signal phase positions for the drive signals for the pair of galvanometers.

35. The method of claim 30, wherein outputting light comprises driving at least one solid-state light emitting structure.

36. The method of claim 35, wherein each at least one solid-state light emitting structure is one of an LED and a laser diode.

37. The method of claim 35, wherein:
   driving at least one solid-state light emitting structure comprises driving a plurality of solid-state light emitting structures; and
   each solid-state light emitting structure emits light at a different wavelength.

38. The method of claim 37, wherein driving the plurality of solid-state light emitting structures comprises selectively driving various ones of the plurality of solid-state light emitting structures to vary the wavelengths of the light beam based on the operational state of the beam deflector.

39. The method of claim 29, wherein controllably generating a pattern of light comprises:
   outputting light onto a liquid crystal device having a plurality of selectable areas;
   selectively activating the plurality of selectable areas to form the pattern of light.

40. The method of claim 39, wherein selectively activating the plurality of selectable areas to form the pattern of light comprises selectively activating the plurality of selectable areas based on the angle of incidence, positional phase angle and arc length of each illuminated area of the pattern of light.

41. The method of claim 29, further comprising:
   sensing light reflected from the sample; and
   outputting an image of the sample based on the sensed light.

42. The method of claim 41, wherein sensing the light reflected from the sample comprises sensing the reflected light using one of a monochrome CCD array and a color CCD array.

43. The method of claim 29, wherein collimating the pattern of light further comprises:
   transmitting the collimated pattern of light along a zone generally surrounding an optical axis of an imaging system usable to receive an image of the sample.

* * * * *